Sept. 24, 1929.   P. R. TUCKER   1,729,369
MANURE SPREADER
Filed March 30, 1926    2 Sheets-Sheet 1

Inventor
Pinkney R. Tucker
By Henry Orth Jr.
Attorney

Sept. 24, 1929.   P. R. TUCKER   1,729,369
MANURE SPREADER
Filed March 30, 1926   2 Sheets-Sheet 2
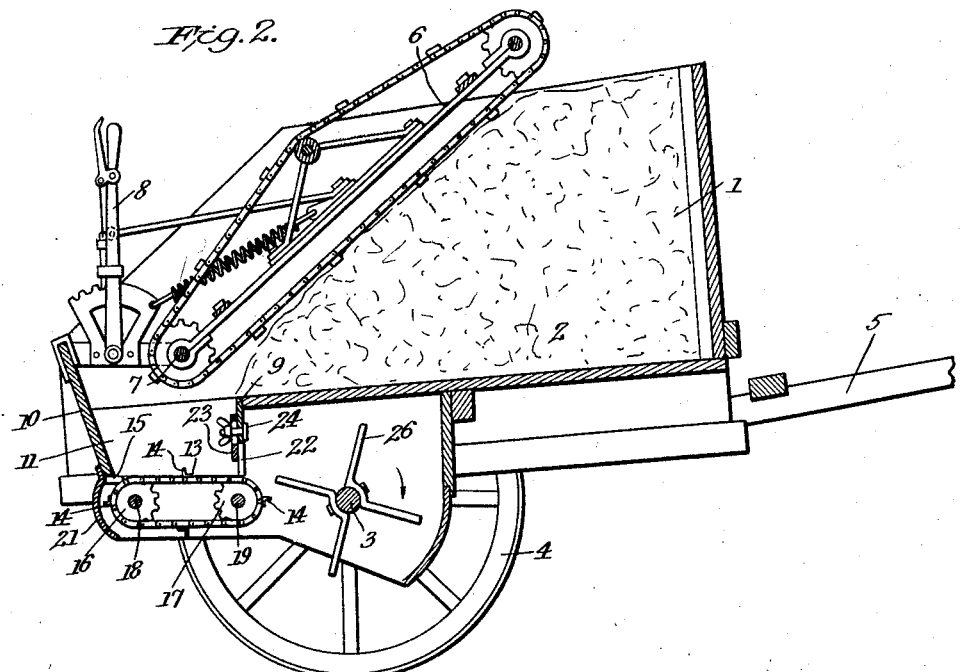
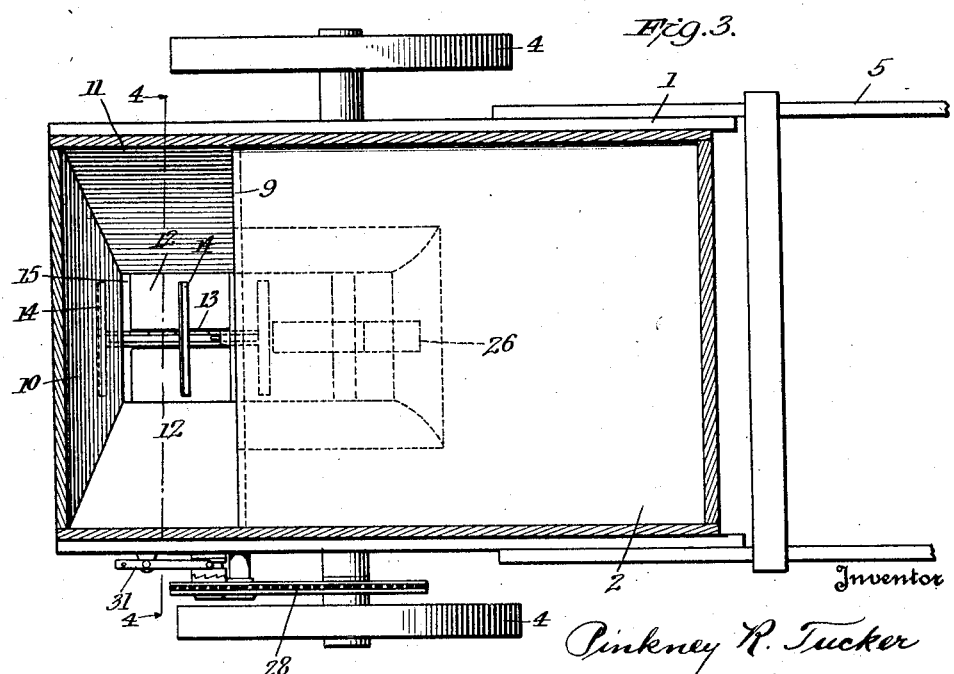

Patented Sept. 24, 1929

1,729,369

UNITED STATES PATENT OFFICE

PINKNEY RUFFIN TUCKER, OF GREENSBORO, NORTH CAROLINA, ASSIGNOR, BY DIRECT AND MESNE ASSIGNMENTS, TO L. F. BRUNT AND L. C. MELCHOR, BOTH OF GREENSBORO, NORTH CAROLINA

MANURE SPREADER

Application filed March 30, 1926. Serial No. 98,526.

My invention relates to manure spreaders and has for its object a two wheeled, one horse manure spreader that will deliver the manure between the wheels of the vehicle that straddle the row and near the rotatable wheel axle, to give a prompter discharge when starting to spread, to control the delivery and overcome the lateral scattering due to the deviation or swing of the vehicle as the horse walks in the furrow.

Other objects are simplicity of construction, and ease of manipulation.

The construction comprises specifically a two wheeled vehicle or cart, with means to discharge the manure gradually over the tail of the cart to a longitudinally directed endless conveyor discharging underneath the cart near the wheel axle, either directly onto the ground but preferably to a set of agitator arms secured to and rotating with the axle.

Other features of construction will hereinafter be described with reference to the drawings, in which like parts are similarly designated and in which Figure 1 is a side elevation of a manure spreader embodying my invention;

Fig. 2 is a longitudinal section;

Fig. 3 is a plan view with the feeding mechanism removed and

Figure 1:
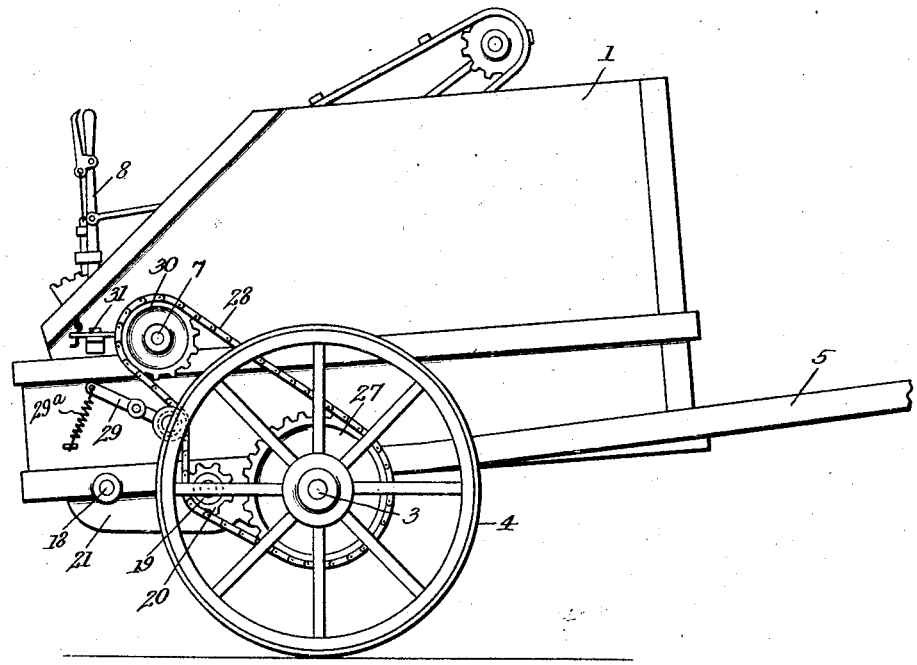
Figure 4:
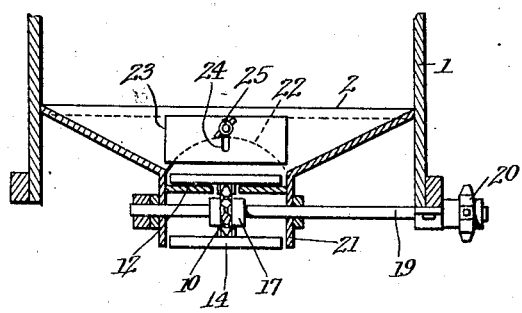
Fig. 4 is a section on line 4—4, Fig. 3.

A body 1 having a stationary bottom 2 is provided with a rotatable axle 3 having two road wheels 4 and is provided with shafts 5 or equivalent draft means to which the draft animal is harnessed.

The load of manure in the cart is gradually unloaded over one end of the stationary bottoms 2 by suitable mechanism 6 operated from a shaft 7 which can be raised and held in its raised position by a lever device 8. The mechanism 6 moves downward by gravity as the surface of the load is gradually fed over the end of the cart bottom 2. This unloading mechanism 6, 7 and 8, is not herein claimed per se, but is shown to give a complete understanding of the invention.

The bottom 2 ends at a vertical depending wall 9 forming a wall of a hopper having an inclined opposite wall 10 forming the end of the cart body and lateral inclined walls 11 that extend downward toward the middle of the body and direct the manure delivered to the hopper by the unloading mechanism 6 over the whole width of the bottom into a narrower stream or mass, condensed in width so to speak, on the floor 12 of the hopper. The hopper floor 12 is in two parts spaced apart sufficiently for the passage of the chain 13 of the endless conveyor provided with one or more conveyor flights 14. The rear end of hopper floor 12 is distanced from the rear end of the cart body at 15 sufficiently for the passage of the flights.

The conveyor chain 13 is directed longitudinally of the cart body underneath the bottom 2 and is provided with two chain wheels 16 and 17 mounted on shafts 18 and 19 respectively, the wheel 16 being idle on its shaft 18 and the one 19 being provided with a driving sprocket 20 on the exterior of the cart body.

The conveyor chain 13 and its sprocket wheels may or may not be guarded by a casing 21, preferably but not necessarily open at its bottom for the ready discharge of any fines that pass through the chain slot between the two sections of hopper floor. The flights 14 are extended across the hopper floor 12 and ride thereon when discharging.

The vertical wall 9 of the hopper has an arched opening 22 through which the flights pass and this opening is controlled by a vertically movable board 23 having a vertical slot 24 through which passes a bolt 25 mounted in the vertical hopper wall 9 and provided with a nut whereby said board can be adjusted over the opening 22 to increase the quantity of manure delivered by the conveyor flights, which are conveniently made of lengths of light angle iron bolted to the conveyor chain or otherwise.

The endless conveyor discharges under the body to two pairs of agitating arms 26 on the cart axle 3 that loosen the manure as it falls from the conveyor into the furrow or row.

Mounted on the axle 3 or on one of the wheels 4 is a large main driving sprocket wheel 27 over which passes a drive chain 28 that is held against sprocket wheel 20 for driving the conveyor by a tightener 29 and then passes over sprocket wheel 30 for the discharge mechanism 6:

A throw out clutch 31 is provided for the sprocket wheel 30 and a like clutch may be provided for the sprocket wheel 20 but in the construction shown it will be simply sufficient to release the spring 29ª of the tightener by unhooking its lower end from its retaining eye or pin and allowing the chain 28 to hang slack out of engagement with sprocket wheel 20.

When the clutch 31 is released and the sprocket chain 28 is slack, the cart may move from one place to another without operating either the conveyor or the unloading device 6.

When these devices are inoperative and the unloading mechanism is raised the cart is loaded and driven to the row or furrow to be supplied with manure. The unloading mechanism is then unlatched and allowed to rest on the load, its clutch thrown in and the tightener set thereupon the chain 28 will operate the unloader to unload into the hopper. The hopper concentrates or narrows the stream of manure and delivers it onto the conveyor, which delivers it to the arms 26 rotating with the axle that agitate and loosen the manure and effect a discharge thereof longitudinally of the row or furrow with little or no transverse scattering.

I am aware that endless conveyors have been used in manure distributers to receive the manure as it is unloaded from the body of the vehicle, but these endless conveyors operate transversely of the vehicle and have decided disadvantages that I have obviated by my invention.

Such heretofore constructed manure spreaders have been two horse vehicles and when spreading, discharge at the sides of the vehicle into two rows or furrows parallel to a middle row or furrow that receives no manure. In discharging the manure is not scattered and confined to a longitudinal narrow row or furrow. The operator cannot walk close to the rear of the spreader. Such devices on a cart would not operate well by reason of the long radius of swing due to irregular side swing of the cart tail.

All this I obviate by concentrating or narrowing the unloaded manure in the hopper and by delivering it to the longitudinally disposed conveyor whose delivery end is near the middle of the cart axle or center of swing of the cart so that no matter how much the horse swings to one side or the other in walking in a furrow the manure will always be discharged into the furrow and no matter what the speed may be the manure will discharge lengthwise of the row or furrow and not across it.

I claim—

1. A manure spreader comprising a vehicle body having a stationary bottom, and a rotatable axle, means to unload manure, an endless conveyor receiving the unloaded manure, longitudinally arranged beneath the body and delivering toward the front of said body, and arms secured to the rotating axle to receive and deposit the manure delivered by said conveyor, and means to actuate the conveyor and unloading means.

2. A manure spreader comprising a vehicle body having a stationary bottom and a rotatable axle, means to unload manure over the rear end of said body, an actuating shaft for said unloader projecting through the side of said body, a sprocket wheel thereon, a clutch between said wheel and its shaft, a hopper into which the manure is unloaded, an endless conveyor extending from the hopper longitudinally beneath the body, an actuating shaft therefor, a sprocket wheel thereon, a sprocket wheel on the axle and a chain common to all of said sprocket wheels.

3. A manure spreader comprising a cart having a rotating axle, a stationary bottom, agitator arms fixed on the axle, a hopper at the rear end of said bottom having a front wall provided with a discharge opening, an endless conveyor operating upon the floor of said hopper through said opening to discharge longitudinally beneath the cart onto the arms on the axle.

4. A manure spreader comprising a cart having a rotating axle, a stationary bottom, arms on the cart axle, a hopper at the rear end of said bottom having a vertical front wall provided with an opening, a two part floor for the hopper, an endless conveyor chain operating between the two parts of the floor and longitudinally disposed, conveyor flights on said chain extending across the hopper floor and arranged to travel thereon and deliver beneath the cart onto the arms on the cart axle.

In testimony that I claim the foregoing as my invention, I have signed my name.

PINKNEY RUFFIN TUCKER.